(12) United States Patent
Yang et al.

(10) Patent No.: US 9,081,196 B2
(45) Date of Patent: Jul. 14, 2015

(54) DISPLAY APPARATUS

(75) Inventors: Yingbao Yang, Kanagawa (JP); Goro Hamagishi, Osaka (JP)

(73) Assignee: JAPAN DISPLAY INC., Tokyo (JP)

( * ) Notice: Subject to any disclaimer, the term of this patent is extended or adjusted under 35 U.S.C. 154(b) by 332 days.

(21) Appl. No.: 13/530,976

(22) Filed: Jun. 22, 2012

(65) Prior Publication Data

US 2013/0003176 A1    Jan. 3, 2013

(30) Foreign Application Priority Data

Jul. 1, 2011   (JP) ................................ 2011-147211

(51) Int. Cl.
*G02B 27/22*    (2006.01)
*G02B 6/34*    (2006.01)
*H04N 13/04*    (2006.01)
*F21V 8/00*    (2006.01)

(52) U.S. Cl.
CPC .......... *G02B 27/2214* (2013.01); *G02B 6/0076* (2013.01); *H04N 13/045* (2013.01); *H04N 13/0418* (2013.01); *G02B 6/0038* (2013.01)

(58) Field of Classification Search
None
See application file for complete search history.

(56) References Cited

U.S. PATENT DOCUMENTS

| 7,425,069 | B2 * | 9/2008 | Schwerdtner et al. | 353/7 |
| 2003/0058383 | A1 * | 3/2003 | Jagt et al. | 349/65 |
| 2007/0008456 | A1 * | 1/2007 | Lesage et al. | 349/62 |
| 2010/0245406 | A1 * | 9/2010 | Redert et al. | 345/690 |
| 2011/0170184 | A1 * | 7/2011 | Wolk | 359/463 |

FOREIGN PATENT DOCUMENTS

| CN | 1926886 A | 3/2007 |
| CN | 100564998 C | 12/2009 |
| CN | 101843105 A | 9/2010 |
| JP | 10-282453 | 10/1998 |
| JP | 11-289558 | 10/1999 |
| JP | 2005-091447 | 4/2005 |
| JP | 2005-223727 | 8/2005 |
| JP | 2010-286813 | 12/2010 |
| JP | 2011-505582 A | 2/2011 |
| JP | 2012-123325 | 6/2012 |
| WO | WO/2009/057030 A1 | 5/2009 |

OTHER PUBLICATIONS

Japanese Office Examination Report issued in connection with related Japanese patent application No. 2011-147211 dated Apr. 30, 2014.

(Continued)

*Primary Examiner* — Jade R Chwasz
(74) *Attorney, Agent, or Firm* — Dentons US LLP

(57) ABSTRACT

A display apparatus includes a display unit that time-divisionally displays a plurality of view point images in N divisions, N being an integer equal to or more than 2, a backlight that irradiates the display unit with image display light, and a separation unit that separates M view point images displayed in the same time slot in the display unit, M being an integer equal to or more than 2. The backlight controllably switches the exit direction of light time-divisionally in synch with the timing of time division display by the display unit, the backlight controllably switching the exit direction of light between N directions.

7 Claims, 9 Drawing Sheets

(56) References Cited

OTHER PUBLICATIONS

Japanese Office Action issued in connection with related Japanese Patent Application No. 2011-147211 dated Mar. 4, 2014.

Chinese Examination Report issued in connection with related Chinese Patent Application No. 201210216926.5 dated Mar. 30, 2015 with English translation.

* cited by examiner

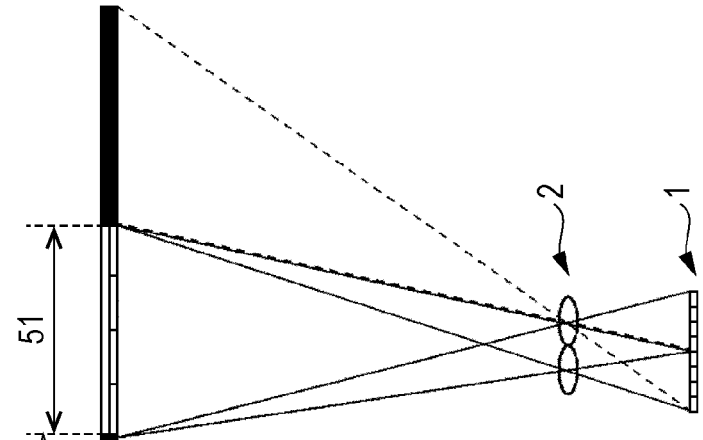
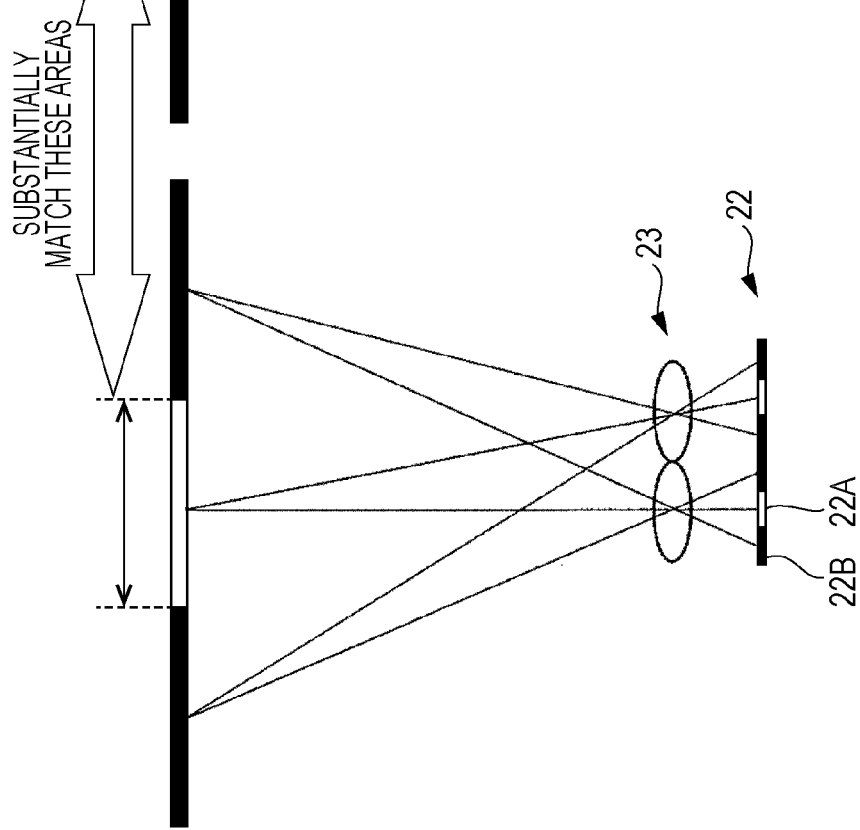

DISPLAY APPARATUS

BACKGROUND

The present disclosure relates to a display apparatus that performs stereoscopic display of naked eye method by using a parallax separator such as a parallax barrier.

There are two types of stereoscopic display methods: a spectacle method that uses spectacles for stereoscopic viewing and a naked eye method that enables stereoscopic viewing by naked eyes without special spectacles for stereoscopic viewing. As a typical spectacle method, there is a shutter spectacle method that uses shutter spectacles having a left eye shutter and a right eye shutter. In the shutter spectacle method, left eye and right eye parallax images are displayed alternately in a frame sequential manner at a high speed and on a two-dimensional display panel. The left eye shutter and the right eye shutter are switched alternately at a timing of displaying left eye and right eye parallax images so that the left eye and right eye parallax images enter the left eye and right eye of the observer, respectively, enabling stereoscopic viewing.

On the other hand, as typical naked eye methods, there are a parallax barrier method and a lenticular lens method. In the parallax barrier method and the lenticular lens method, a parallax image for stereoscopic viewing (a right eye parallax image and a left eye parallax image in the case of two view points) is spatially divided and displayed on a two-dimensional display panel, and the parallax image is subjected to parallax division in a horizontal direction by a parallax separator to achieve stereoscopic viewing. In the parallax barrier method, a parallax barrier having a slit-shaped opening is used as the parallax separator. In the lenticular lens method, a lenticular lens in which a plurality of cylindrical split lenses are arranged is used as the parallax separator.

SUMMARY

In the naked eye method using a parallax separator, however, since a plurality of view point images are spatially divided and displayed in one screen of a two-dimensional display panel, the display resolution of each view point image may become more degraded than the display resolution of the display panel. This degradation of the display resolution becomes heavy as the number of view point images increases.

On the other hand, in the naked eye method, the main lobe, which is an observation area that allows normal stereoscopic viewing, is present in the middle. The side lobes, which are a plurality of observation areas that allow the same normal stereoscopic viewing as in the main lobe, are present in the lateral direction with the main lobe sandwiched therebetween. A plurality of view point images in the same state (arrangement) are displayed in each of the main lobe and side lobes. For example, when three-view-point stereoscopic display is performed, view point images for three view points are displayed in the same arrangement in each of the main lobe and side lobes. Japanese Unexamined Patent Application Publication No. 10-282453 and Japanese Unexamined Patent Application Publication No. 2005-91447 each describe the structure of a stereoscopic display apparatus in which a parallax separator is placed on the image display side of a two-dimensional display panel and a lobe controller is placed between the two-dimensional display panel and the parallax separator. In this stereoscopic display apparatus, the lobe controller time-divisionally displays the main lobe and the side lobes alternately and time-divisionally switches between a plurality of view point images to be displayed on a two-dimensional display panel, so that different view point images are displayed in the main lobe and the side lobes. This plans an increase in the number of view points and enlargement of observation areas.

It is desirable to provide a display apparatus capable of increasing the number of view points enabling stereoscopic viewing and of enlarging observation areas.

According to an embodiment of the present disclosure, there is provided a display apparatus that includes a display unit that time-divisionally displays a plurality of view point images in N divisions, N being an integer equal to or more than 2, a backlight that irradiates the display unit with image display light, and a separation unit that separates M view point images displayed in the same time slot in the display unit, M being an integer equal to or more than 2. The backlight can be controlled so that the exit direction of light is switched between N directions. The exit direction of light is time-divisionally switched in synch with the timing of time division display by the display unit.

In the display apparatus according to the embodiment of the present disclosure, the display unit time-divisionally displays a plurality of view point images in N divisions. In the backlight, the exit direction of light is switched between N directions and the exit direction of light is time-divisionally switched in synch with the timing of time division display by the display unit. Accordingly, the continuous stereoscopic viewing of N observation areas is enabled as a whole.

The display apparatus according to the embodiment of the present disclosure can increase the number of view points enabling stereoscopic viewing and enlarge observation areas since a plurality of view point images is time-divisionally displayed in the display unit in N divisions and the exit direction of light of the backlight is time-divisionally switched in synch with the timing of time division display by the display unit.

BRIEF DESCRIPTION OF THE DRAWINGS

FIG. 10A shows the directions in which light is emitted from a backlight of the display apparatus according to the modification. FIG. 10B shows one observation area formed by a lenticular lens that functions as a parallax separator of the display apparatus according to the modification.

DETAILED DESCRIPTION OF EMBODIMENTS

An embodiment of the present disclosure will be described with reference to the drawings.

[Entire Structure of Display Apparatus]

Figure 1:
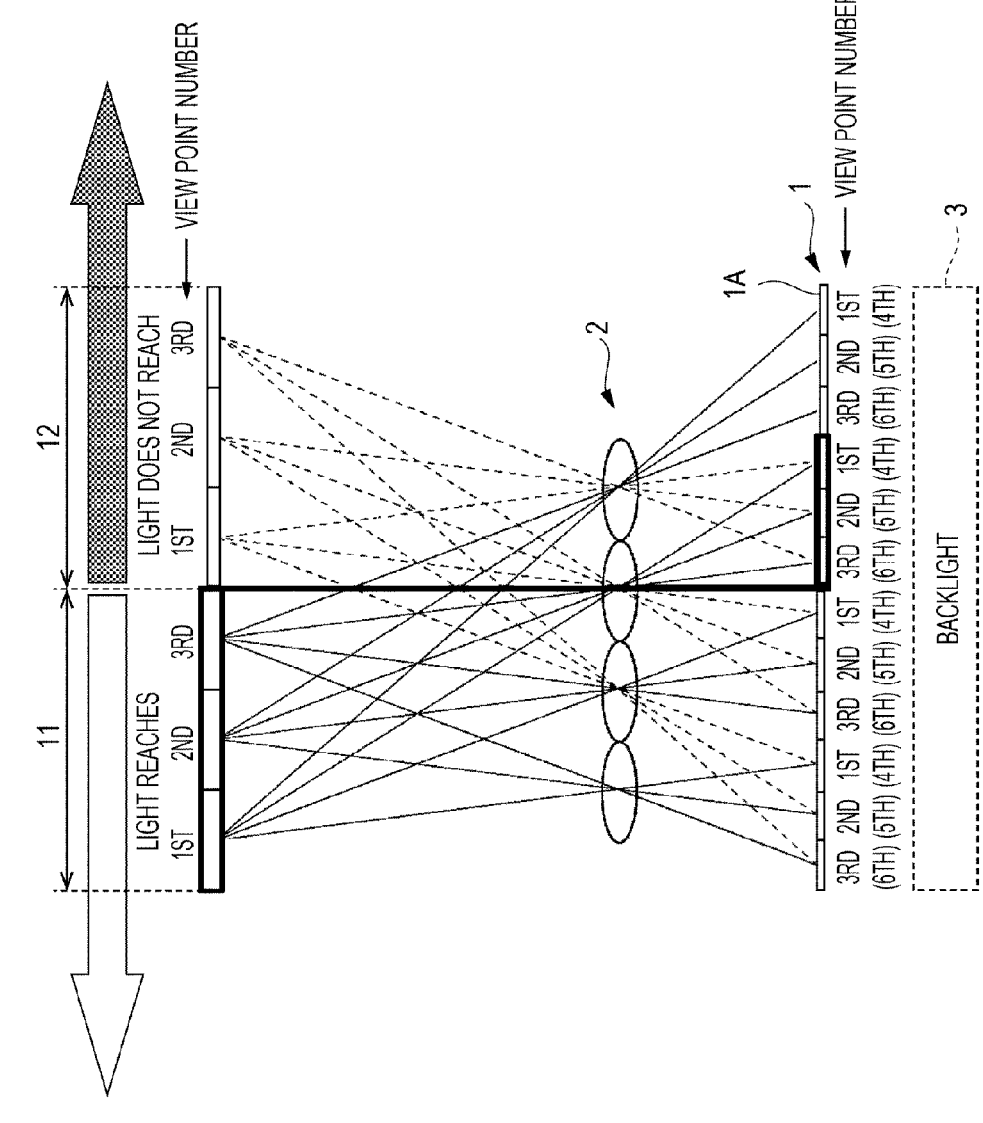
FIG. 1 is a sectional view illustrating the entire structure and a first display state of a display apparatus according to an embodiment of the present disclosure.
Figure 2:
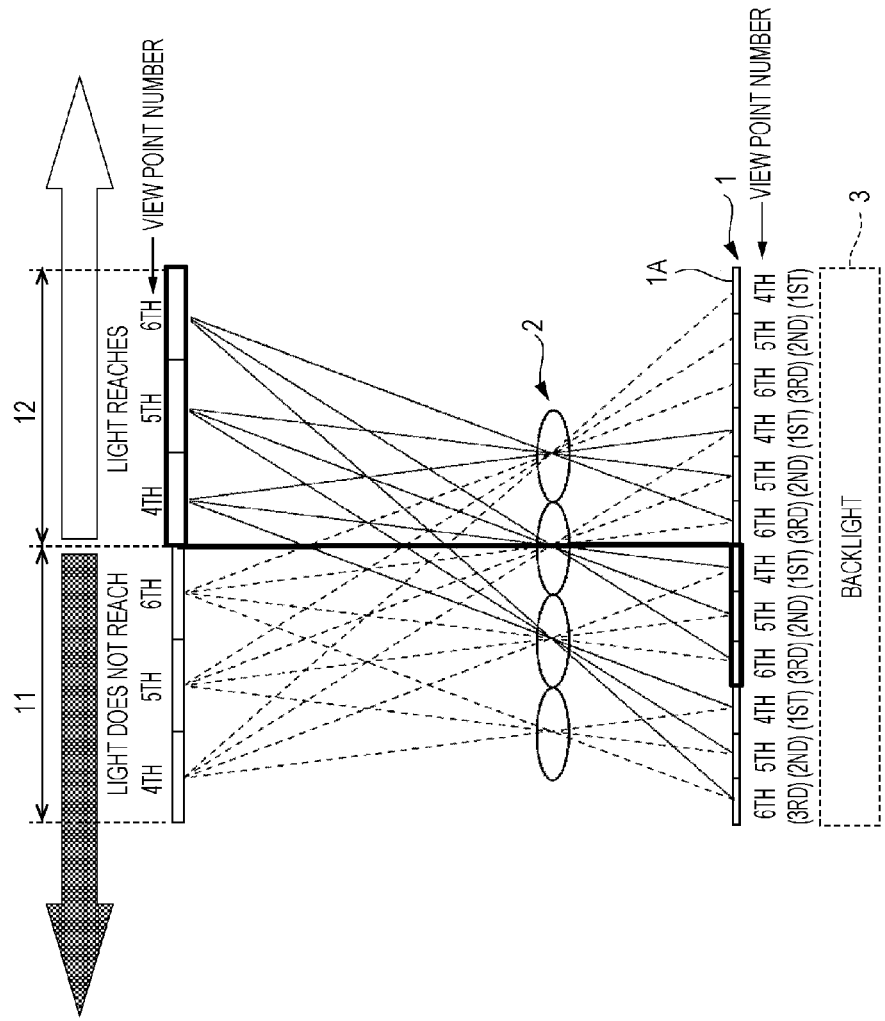
FIG. 2 is a sectional view illustrating a second display state of the display apparatus shown in FIG. 1.

FIGS. 1 and 2 show a structure example of a display apparatus according to an embodiment of the present disclosure. This display apparatus includes a display unit 1, lenticular lenses 2 as parallax separators (separation unit), and a backlight 3.

The display unit 1 includes a two-dimensional transmissive display, which is, for example, a transmissive liquid crystal display panel. A plurality of pixels (or subpixels) 1A are two-dimensionally arranged on the display screen of the display unit 1. A plurality of view point images are time-divisionally displayed in N (an integer equal to or more than 2) divisions on the display screen of the display unit 1.

In examples in FIGS. 1 and 2, first to sixth view point images are time-divisionally displayed in N (=2) divisions; FIG. 1 shows the first to third view point images and FIG. 2 shows the fourth to sixth view point images. That is, in the display state in FIG. 1, the first to third view point images are repeatedly assigned to the plurality of pixels (or subpixels) 1A and a parallax synthetic image in which the first to third view point images are synthesized into one screen is displayed. In the display state in FIG. 2, the fourth to sixth view point images are repeatedly assigned to the plurality of pixels (or subpixels) 1A and a parallax synthetic image in which the fourth to sixth view point images are synthesized into one screen is displayed.

The lenticular lenses 2 are, for example, a plurality of cylindrical divisional lenses arranged in parallel. The lenticular lenses 2 separate M (an integer equal to or more than 2) view point images displayed in the same time slot in the display unit 1 and form M view point images in each of N observation areas. In the examples in FIGS. 1 and 2, M (=3) view point images displayed in the same time slot are separated and three view point images are formed in each of N (=2) observation areas (a first observation area 11 and a second observation area 12).

An example of the lenticular lens method, which uses the lenticular lenses 2, is described in this embodiment, but the structure of a display apparatus that uses the parallax barrier method is allowed. In this case, a parallax barrier element as a parallax separator is used instead of the lenticular lenses 2. A parallax barrier element includes an opening that transmits light and a shield unit that shields light.

The backlight 3 switches the exit direction of light between N directions corresponding to N observation areas. The exit direction of light is time-divisionally switched in synch with the timing of time division display by the display unit 1.

In the examples in FIGS. 1 and 2, the backlight 3 switches the exit direction of light between N (=2) directions corresponding to N (=2) observation areas (the first observation area 11 and the second observation area 12). That is, the exit direction of light is switched to the direction corresponding to the first observation area 11 in FIG. 1 and the exit direction of light is switched to the direction corresponding to the second observation area 12 in FIG. 2. In the examples in FIGS. 1 and 2, the border of the two observation areas (the first observation area 11 and the second observation area 12) corresponds to the middle of the display unit 1. The backlight 3 switches the exit direction of light between the two directions with respect to the border of the two observation areas.

[Entire Operation of Display Apparatus]

In this display apparatus, the plurality of view point images are time-divisionally displayed in N divisions on the display unit 1. The backlight 3 switches the exit direction of light between the N direction corresponding to the N observation areas and time-divisionally switches the exit direction of light in synch with the timing of time division display by the display unit 1. This enables the continuous stereoscopic viewing of the N observation areas as a whole, increases the number of view points enabling stereoscopic viewing, and enlarges the observation areas.

In the examples in FIGS. 1 and 2, the first to third view point images are initially displayed as a first display state (FIG. 1) on the display unit 1. The lenticular lenses 2 form the first to third view point images in each of the first observation area 11 and the second observation area 12. In sync with this, the backlight 3 switches the exit direction of light to the direction corresponding to the first observation area 11. In this case, since light does not reach the second observation area 12, eventually, only the first to third view point images displayed in the first observation area 11 can be observed.

Next, the fourth to sixth view point images are displayed on the display unit 1 as the second display state (FIG. 2). The lenticular lenses 2 form the fourth to sixth view point images in each of the first observation area 11 and the second observation area 12. In sync with this, the backlight 3 switches the exit direction of light to the direction corresponding to the second observation area 12. In this case, since light does not reach the first observation area 11, eventually, only the fourth to sixth view point images displayed in the second observation area 12 can be observed.

The first display state in FIG. 1 and the second display state in FIG. 2 are alternately switched quickly enough not to recognized by human eyes, so that the observation area for which normal stereoscopic viewing is enabled as a whole becomes the combination of the first observation area 11 and the second observation area 12. The number of view points as a whole becomes 6.

[First Specific Example of Backlight 3]

Figure 3:
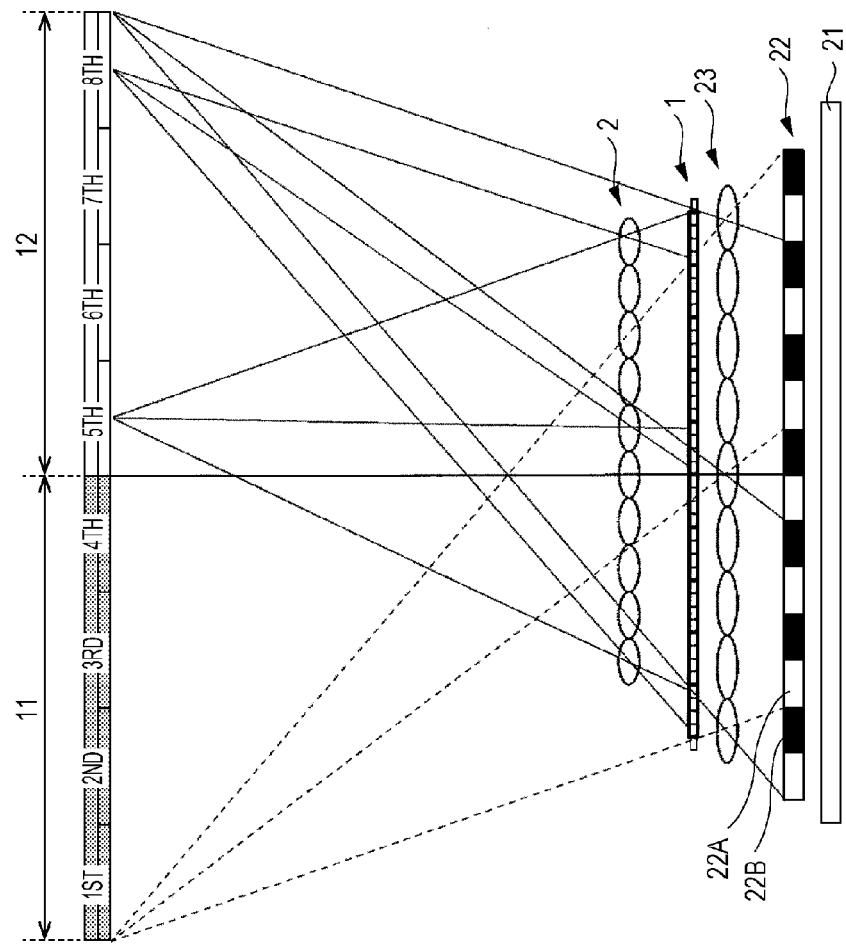
FIG. 3 is a sectional view illustrating a first structure example of a backlight of the display apparatus shown in FIG. 1.

FIG. 3 is a first specific example of the backlight 3. In the example in FIG. 3, the first to fourth view point images are displayed in the first display state and the fifth to eighth view point images are displayed in the second display state and the total number of view points is eight.

In the first specific example, the backlight 3 includes a light source 21, an optical modulation device 22, and lenticular lenses 23. The light source 21 is a fluorescence lamp such as a CCFL (cold cathode fluorescence lamp) etc. or a planar light source including a LED (light emitting diode).

The optical modulation device 22 includes, for example, a liquid crystal diode. The optical modulation device 22 includes openings 22A, which passes light from the light source 21, and shield units 22B, which shield light and the position of the opening 22A can be controllably switched between N different positions time-divisionally. The lenticular lens 23 are, for example, a plurality of cylindrical divisional lenses arranged in parallel. The lenticular lens 23 focuses the light having passed through the openings 22A on the side of display unit 1.

In the first specific example, the position of the opening 22A of the optical modulation device 22 is changed to controllably switch the exit direction of light. FIG. 3 shows the state in which the exit direction of light is switched to the direction corresponding to the second observation area 12.

[Second Specific Example of Backlight 3]

Figure 4:
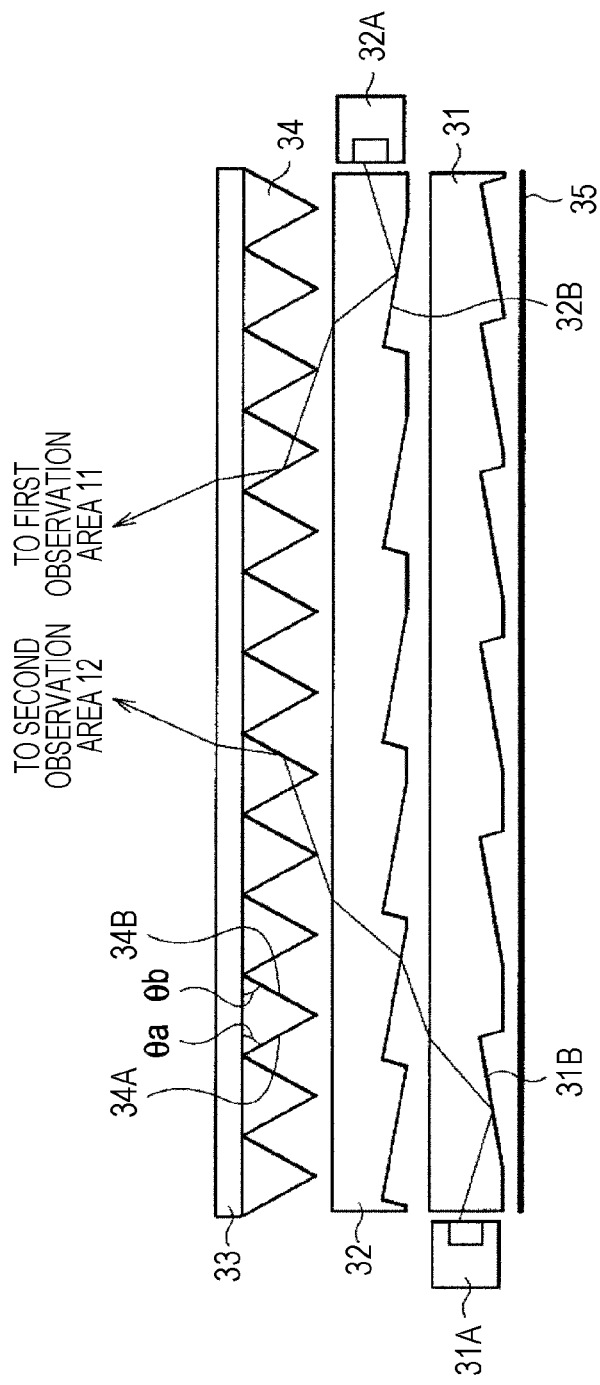
FIG. 4 is a sectional view illustrating a second structure example of a backlight of the display apparatus shown in FIG. 1.

FIG. 4 is a second specific example of the backlight 3. The backlight 3 in this example includes a reflector 35, a lower optical waveguide 31, an upper optical waveguide 32, and a prism sheet 33, which are arranged in sequence from the bottom. The lower optical waveguide 31 and the upper optical waveguide 32 are placed so as to face each other and have mutually different exit directions of light. A light source 31A that includes a fluorescence lamp such as a CCFL etc. or a LED etc. on one side of the lower optical waveguide 31. Similarly, a light source 32A is placed on one side of the upper optical waveguide 32. The light source 31A on the lower optical waveguide 31 and the light source 32A on the upper optical waveguide 32 are placed on mutually opposite sides. In FIG. 4, the light source 31A is placed on the left side and the light source 32A is placed on the right side.

A plurality of inclined planes 31B are formed on the bottom of the lower optical waveguide 31. The inclined planes 31B are inclined toward the orientation in which the light source 31A is placed, so that light emitted by the light source 31A exits externally in a certain angle from the upper surface of the lower optical waveguide 31. The exit light from the lower optical waveguide 31 exits in the direction corresponding to the second observation area 12 through the upper optical waveguide 32 and the prism sheet 33.

A plurality of inclined planes 32B are formed on the bottom of the upper optical waveguide 32. The inclined planes 32B are inclined toward the orientation in which the light source 32B is placed, so that light emitted by the light source 32A exits externally in a certain angle from the upper surface of the upper optical waveguide 32. The exit light from the upper optical waveguide 32 exits in the direction corresponding to the first observation area 11 through the prism sheet 33.

The prism sheets 33 are placed on the lower optical waveguide 31 and the upper optical waveguide 32 so as to face each other. The prism sheet 33 has a plurality of inverted prisms 34 with a section shaped like an inverted triangle having the first vertex facing the optical waveguide. The first surface 34A of each of the inverted prisms 34 reflects the exit light from the upper optical waveguide 32 in the direction corresponding to the first observation area 11. The second surface 34B of each of the inverted prisms 34 reflects the exit light from the lower optical waveguide 31 in the direction corresponding to the second observation area 12.

Figure 5:
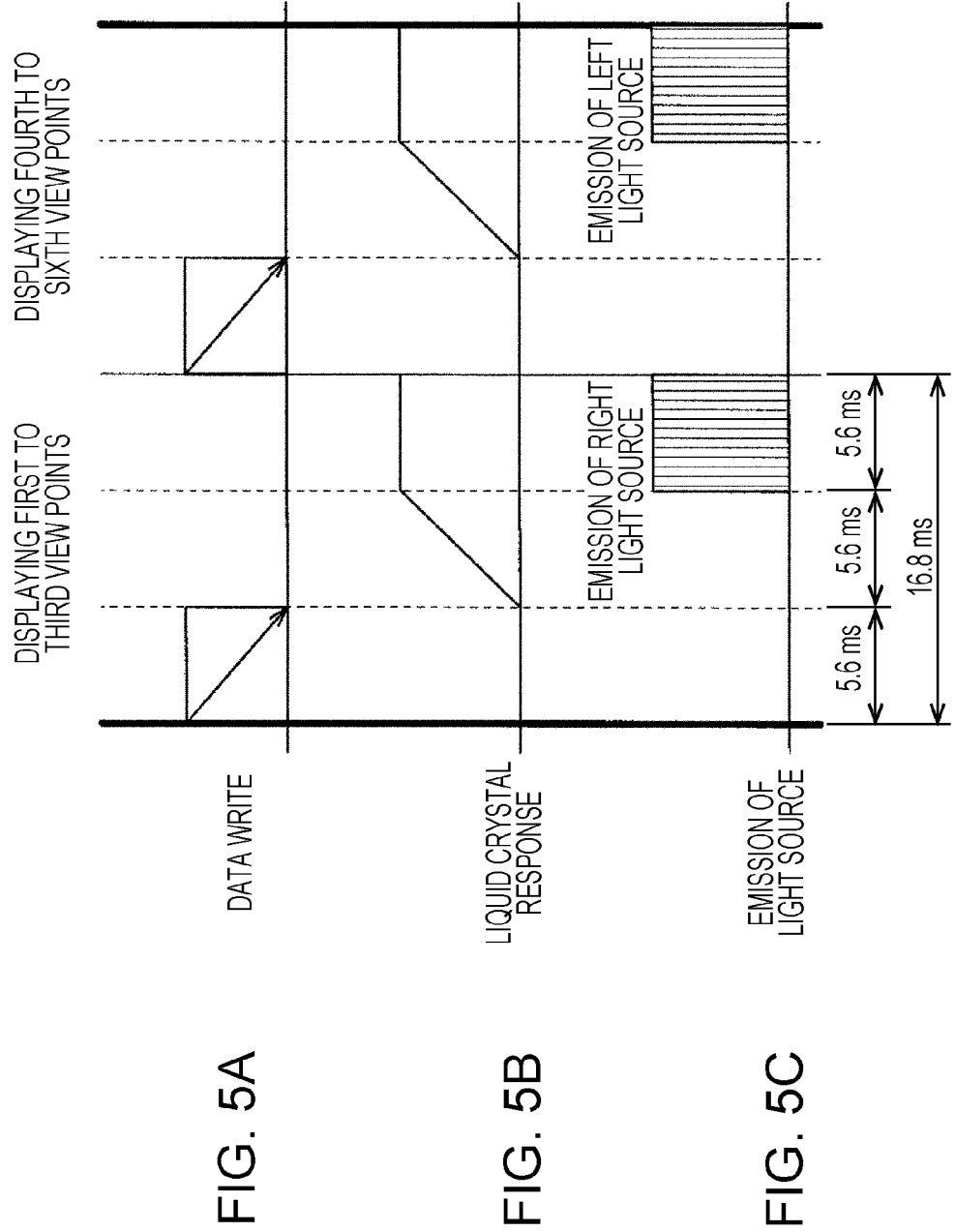
FIGS. 5A to 5C show a timing example of time division control of a display apparatus including the backlight shown in FIG. 4.

In the second specific example, the lower optical waveguide 31 and the upper optical waveguide 32 are time-divisionally driven alternately, so that the exit direction of light is controllably switched. FIGS. 5A to 5C show examples of the timing of time division control when the backlight 3 has the structure shown in FIG. 4. FIG. 5A shows the timing at which view point image data is written to the display unit 1; FIG. 5B shows the response timing of the liquid crystal when the display unit 1 is a liquid crystal display; FIG. 5C shows the light source emission timings of the lower optical waveguide 31 (the light source 31A on the left side) and the upper optical waveguide 32 (the light source 32A on the right side) in the backlight 3.

In FIG. 5A, the first to third view point image data is written to the display unit 1. Next, as shown in FIGS. 5B and 5C, the light source 32A on the right side lights when the response of the liquid crystal of the display unit 1 is completely performed. This allows only the first to third view point images displayed in the first observation area 11 to be observed. Next, as shown in FIG. 5A, the fourth to sixth view point image data is written to the display unit 1. Next, as shown in FIGS. 5B and 5C, the light source 31A on the left side lights when the response of the liquid crystal of the display unit 1 is completely performed. This allows only the fourth to sixth view point images displayed in the second observation area 12 to be observed.

(Vertex Angle of Inverted Prism 34)

Figure 6:
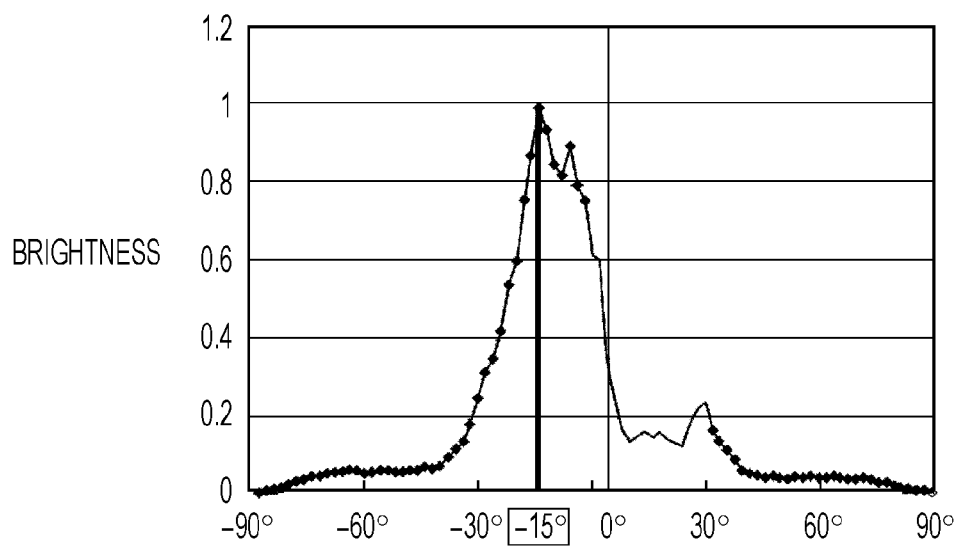
FIG. 6 is a graph showing the distribution of the brightness of light emitted in the left direction from the backlight shown in FIG. 4.
Figure 7:
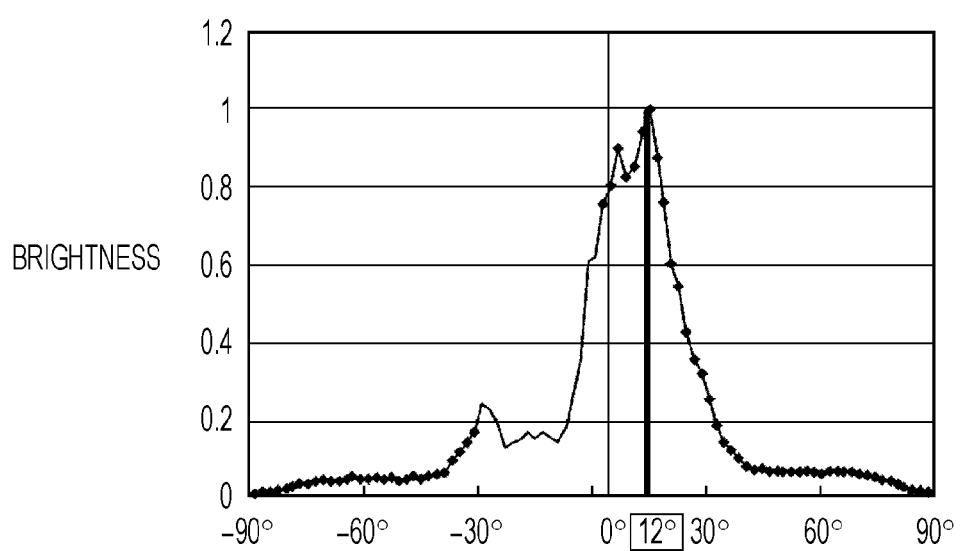
FIG. 7 is a graph showing the distribution of the brightness of light emitted in the right direction from the backlight shown in FIG. 4.

FIG. 6 shows the distribution in the brightness of light emitted in the left direction (toward the first observation area 11) when the light source 32A on the right side lights in the backlight 3 in FIG. 4. FIG. 7 shows the distribution in the brightness of light emitted in the right direction (toward the second observation area 12) when the light source 31A on the left side lights in the backlight 3 in FIG. 4. On the horizontal axis, the middle direction of the display unit 1 is assumed to be 0°, the left direction to be minus values, and the right direction to be plus values.

The characteristics in FIGS. 6 and 7 are obtained through a simulation of brightness characteristics if the angle of the first vertex (the lower vertex formed by the first surface 34A and the second surface 34B) of the inverted prisms 34 is approximately 70° and the angle θa of a second vertex and the angle θb of a third vertex on the bottom side are the same. In such a configuration, as shown in FIGS. 6 and 7, the peak of the brightness appears at −15° on the left side and it appears at 12° on the right side and the shapes are asymmetrical. This is because the angle of the exit light from the lower optical waveguide 31 is affected by the upper optical waveguide 32. When using a normal symmetrical prism in which the angle θa of the second vertex equals the angle θb of the third vertex on the bottom side of the inverted prisms 34, light from the upper optical waveguide 32 is relatively refracted greatly to the left. The angle of light refracted to the right by the lower optical waveguide 31 becomes relatively a little smaller. It is preferable that the angle θa of the second vertex differs from the angle θb of the third vertex. More specifically, it is preferable to make the angle θa of the second vertex smaller than the angle θb of the third vertex by using the values below, for example. This makes light from the backlight 3 exit evenly at angles of ±13.6° in the left and right direction.

θa=54.3°, θb=55.7°

Figure 8:
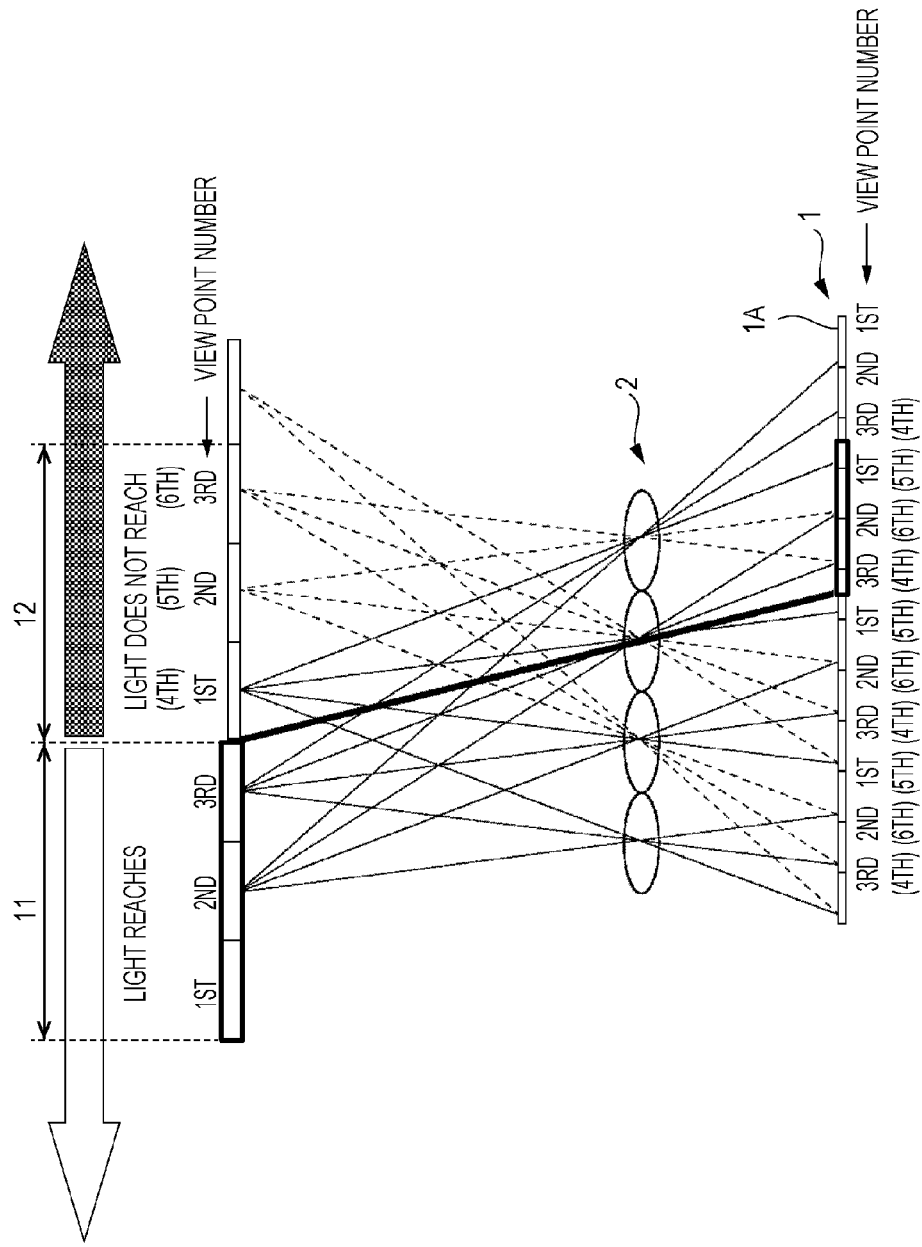
FIG. 8 is a sectional view showing an example of the display state of the display apparatus including the backlight shown in FIG. 4.

If the distribution in the brightness of light of the backlight 3 is not symmetrical as shown in the characteristics in FIGS. 6 and 7, it is sufficient to displace the border of the two observation areas (the first observation area 11 and the second observation area 12) depending on the difference in the distribution in the brightness. FIG. 8 shows an example of such a display state. In examples in FIGS. 1 and 2, the border of the two observation areas is aligned with the middle of the display unit 1. In the display example in FIG. 8, the border of the two observation areas is displaced to the left.

[Modification]

In the above description, an example of time-divisional display in N (=2) divisions is shown, but display in N (=3) divisions is also possible.

Figure 9:
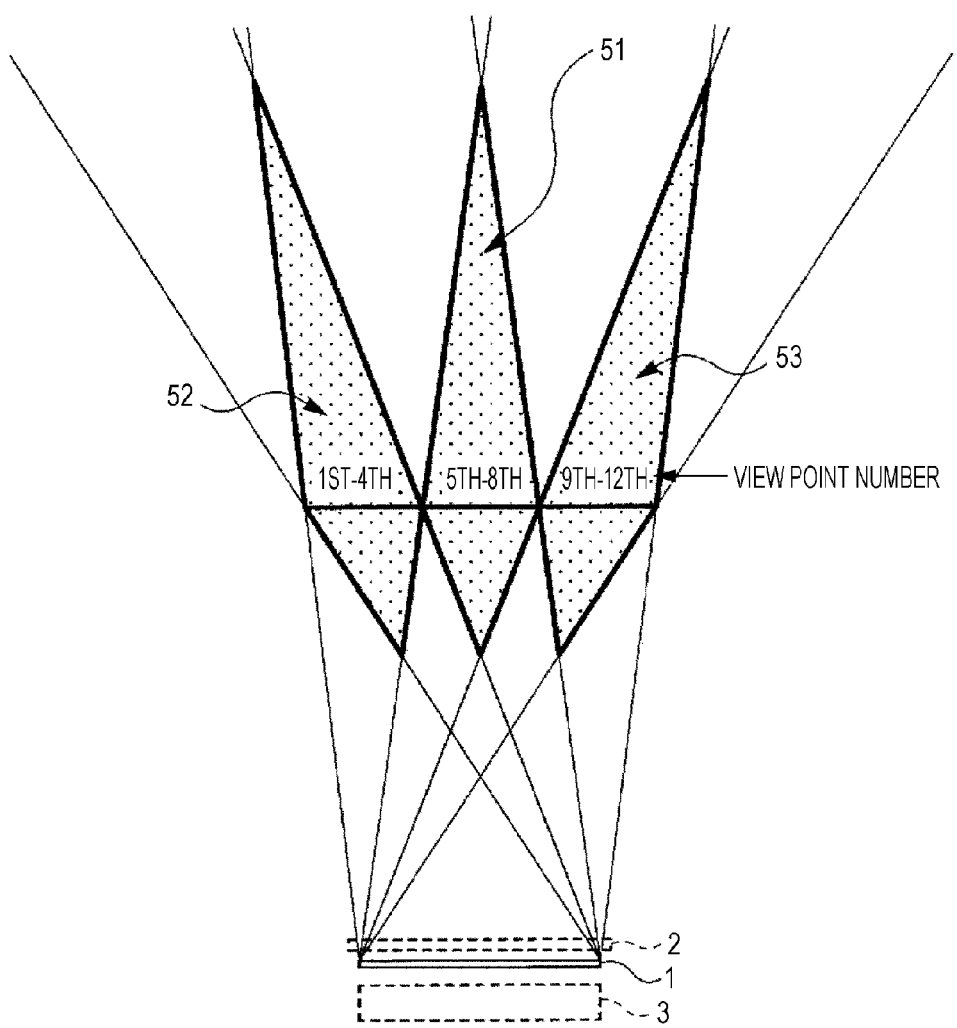
FIG. 9 is a sectional view illustrating the entire structure and display state of a display apparatus according to a modification.

FIG. 9 shows an example of time-divisionally displaying the first to twelve view point images in N (=3) divisions. In the example in FIG. 9, the lenticular lenses 2 separates M (=4) view point images displayed in the same time slot and forms four view point images in each of N (=3) observation areas (the first observation area 51, the second observation area 52, and the third observation area 53). The first observation area 51 corresponds to the so-called main lobe, the second observation area 52 corresponds to the first side lobe, and the third observation area 53 corresponds to the second side lobe.

FIG. 10A shows the exit direction of light from a backlight 3 of a display apparatus according to this modification. FIG. 10A illustrates the structure including an optical modulation device 22 shown as the backlight 3 in FIG. 3 and lenticular lenses 23. FIG. 10B shows the first observation area 51 formed by lenticular lenses 2 as parallax separators (separation unit). As shown in FIGS. 10A and 10B, the backlight 3 controllably switches the exit direction of light to three directions delimited by both ends of the first observation area 51.

In this modification, in the first display state, the display unit 1 displays the fifth to eighth view point images and the backlight 3 switches the exit direction of light to the direction corresponding to the first observation area 51. Since light does not reach the second observation area 52 and the third observation area 53 in this case, only the fifth to eighth view point images displayed in the first observation area 51 can be observed eventually. Similarly, only the first to fourth view point images displayed in the second observation area 52 can be observed in the second display state and only the ninth to twelfth view point images displayed in the third observation area 53 can be observed in the third display state.

In this modification, the optical waveguide type as shown in FIG. 4 can be used as the backlight 3. FIG. 4 shows the structural example in which the lower optical waveguide 31 and the upper optical waveguide 32 are arranged so as to face each other, but three or more optical waveguides can be arranged so as to face each other to controllably switch the exit direction of light to three or more directions.

[Effect]

As described above, according to the display apparatus in the embodiment of the present disclosure, a plurality of view point images are time-divisionally displayed in the display unit 1 in N divisions and the exit direction of light from the backlight 3 is time-divisionally switched in synch with the timing of time division display by the display unit 1, so that the number of view points enabling stereoscopic viewing is increased and the observation areas is enlarged.

<Other Embodiments>

The technology according to the present disclosure is not limited to the above embodiments and various modifications can be made.

For example, the present technology can take the following structures.

(1)

A display apparatus including:

a display unit that time-divisionally displays a plurality of view point images in N divisions, N being an integer equal to or more than 2;

a backlight that irradiates the display unit with image display light; and a separation unit that separates M view point images displayed in the same time slot in the display unit, M being an integer equal to or more than 2; wherein the backlight controllably switches the exit direction of light time-divisionally in synch with the timing of time division display by the display unit, the backlight controllably switching the exit direction of light between N directions.

(2)

The display apparatus according to (1), wherein the separation unit forms the M view point images in each of N observation areas.

(3)

The display apparatus according to (2), wherein the backlight controllably switches the exit direction of light between the N directions corresponding to the N observation areas.

(4)

The display apparatus according to any one of (1) to (3), wherein the display unit displays a different view point image in each of the N divisions of time division display.

(5)

The display apparatus according to (3), wherein the display unit time-divisionally displays the plurality of view point images in two divisions, the separation unit forms the M view point images in each of two observation areas, a border between the two observation areas corresponds to the middle of the display unit, and the backlight controllably switches the exit direction of light between two directions with respect to the border between the two observation areas.

(6)

The display apparatus according to (3), wherein the display unit time-divisionally displays the plurality of view point images in three or more divisions, the separation unit forms the M view point images in each of three or more observation areas, and the backlight controllably switches the exit direction of light between three or more directions with respect to both ends of each of the observation areas.

(7)

The display apparatus according to any one of (1) to (6), wherein the backlight includes a light source, an optical modulation device that has an opening through which light from the light source passes and a shield unit that shields the light and controllably switches the position of the opening between N different positions time-divisionally, and a lenticular lens that focuses the light having passed through the opening.

(8)

The display apparatus according to any one of (1) to (5), wherein the backlight includes a plurality of optical waveguides that are arranged so as to face each other, the optical waveguides having different exit directions of light from each other, and a prism sheet that has a plurality of prisms formed therein and are arranged so as to face the plurality of optical waveguides, wherein the exit direction of light is controllably switched by time-divisionally driving of the plurality of optical waveguides.

(9)

The display apparatus according to (8), wherein each of the prisms is an inverted prism having a first vertex facing the plurality of optical waveguides, each of the prisms having an inverted-triangle-shaped section, and the angles of a second vertex and a third vertex on the bottom of each of the inverted prisms are different from each other.

The present disclosure contains subject matter related to that disclosed in Japanese Priority Patent Application JP 2011-147211 filed in the Japan Patent Office on Jul. 1, 2011, the entire contents of which are hereby incorporated by reference.

What is claimed is:

1. A display apparatus comprising:
 a display unit that time-divisionally displays a plurality of view point images in N divisions, N being an integer equal to or more than 2;
 a backlight that irradiates the display unit with image display light; and
 a separation unit that separates M view point images displayed in the same time slot in the display unit, M being an integer equal to or more than 2,
 wherein,
 the backlight controllably switches the exit direction of light time-divisionally in synch with the timing of time division display by the display unit, the backlight controllably switching the exit direction of light between N directions, the backlight includes (a) an upper optical waveguide and a lower optical waveguide arranged so as to face each other, the upper optical waveguide and the lower optical waveguide having different exit directions of light from each other, (b) a first light source that is on a side of the upper optical waveguide, (c) a second light source that is on a side of the lower optical waveguide, (d) a prism sheet that includes a plurality of prisms formed therein and arranged so as to face the upper optical waveguide, and the prism sheet being separated from the upper optical waveguide and the lower optical waveguide, the exit direction of light is controllably switched by time-divisionally driving the upper optical waveguide and the lower optical waveguide, and one of light sources corresponds to the target view point image and emits light after writing data to the display unit and a response of the display unit is completely performed for each target view point image.

2. The display apparatus according to claim 1, wherein the separation unit forms the M view point images in each of N observation areas.

3. The display apparatus according to claim 2, wherein the backlight controllably switches the exit direction of light between the N directions corresponding to the N observation areas.

4. The display apparatus according to claim 3, wherein the display unit time-divisionally displays the plurality of view point images in two divisions, the separation unit forms the M view point images in each of two observation areas, a border between the two observation areas corresponds to the middle of the display unit, and the backlight controllably switches the exit direction of light between two directions with respect to the border between the two observation areas.

5. The display apparatus according to claim 3, wherein the display unit time-divisionally displays the plurality of view point images in three or more divisions, the separation unit forms the M view point images in each of three or more observation areas, and the backlight controllably switches the exit direction of light between three or more directions with respect to both ends of each of the observation areas.

6. The display apparatus according to claim 1, wherein the display unit displays a different view point image in each of the N divisions of time division display.

7. The display apparatus according to claim 1, wherein each of the prisms is an inverted prism having a first vertex facing the upper optical waveguide, each of the prisms having an inverted-triangle-shaped section, and the angles of a second vertex and a third vertex on the bottom of each of the inverted prisms are different from each other.

* * * * *